(12) United States Patent
Richter

(10) Patent No.: US 6,840,485 B2
(45) Date of Patent: Jan. 11, 2005

(54) SUPPORT DEVICE FOR SUPPORTING AN ARTICLE

(76) Inventor: Herbert Richter, Drosselweg 8, 75331 Engelbrand (DE)

( * ) Notice: Subject to any disclaimer, the term of this patent is extended or adjusted under 35 U.S.C. 154(b) by 0 days.

(21) Appl. No.: 10/772,568

(22) Filed: Feb. 5, 2004

(65) Prior Publication Data

US 2004/0155164 A1 Aug. 12, 2004

(30) Foreign Application Priority Data

Feb. 6, 2003 (DE) .................................. 203 01 837 U

(51) Int. Cl.$^7$ ................................................ A47K 1/08
(52) U.S. Cl. ........................ 248/311.2; 248/314; 411/24
(58) Field of Search ............................. 248/311.2, 313, 248/314, 309.1, 316.1; 411/24, 26, 34, 38

(56) References Cited

U.S. PATENT DOCUMENTS

| | | | | |
|---|---|---|---|---|
| 1,120,368 A | * | 12/1914 | Booraem et al. | ............. 411/26 |
| 3,202,034 A | * | 8/1965 | Korenchan | .................... 411/24 |
| 3,911,782 A | * | 10/1975 | Liebig | .......................... 411/24 |
| 4,078,471 A | * | 3/1978 | Archibald et al. | ............ 411/24 |
| 6,012,886 A | * | 1/2000 | Tanamura et al. | ............ 411/24 |
| 6,142,486 A | * | 11/2000 | Cedarberg, III | ............. 279/103 |
| 6,189,407 B1 | * | 2/2001 | Champ et al. | ............. 74/502.4 |

* cited by examiner

*Primary Examiner*—Leslie A. Braun
*Assistant Examiner*—Tan Le
(74) *Attorney, Agent, or Firm*—K. Bach

(57) ABSTRACT

In a support device for supporting an article, particularly in a motor vehicle, wherein the support device comprises a support arm having at one end thereof a clamping element, the clamping element includes a cylindrical bushing of an elastic material for reception in a cylindrical opening and means are provided for expanding the bushing into firm engagement with the wall of the opening for securely supporting the support arm in the cylindrical opening.

3 Claims, 2 Drawing Sheets

SUPPORT DEVICE FOR SUPPORTING AN ARTICLE

BACKGROUND OF THE INVENTION

The invention relates to a support device, including a clamping structure, for supporting an article particularly in a motor vehicle.

Such support devices are used for example for the mounting of a reading light. The reading light is disposed at one end of a so-called goose-neck, which is provided at its other end with a clamp by way of which the gooseneck can be mounted on various components.

Furthermore, support devices for mobile telephones are known which include a clamping element by way of which the support devices can be mounted for example to the register of an air vent of a vehicle. Although such arrangements are generally operational, a gooseneck cannot be used with such a support arrangement. The forces generally effective on the support structure for a gooseneck are too large for clamping structures.

In order to mount, for example, a mobile phone support structure on a gooseneck, the gooseneck has to be firmly supported. This has been done so far by providing the gooseneck with a clamp by way of which the gooseneck was mounted, for example, to support rods of a headrest or it is provided with a base member, which is screwed to a vehicle body structure. This however is relatively expensive and inconvenient.

It is the object of the present invention to provide a support device for supporting an article in a motor vehicle by means of a gooseneck which can be conveniently and firmly mounted to the vehicle by a mounting structure by which the support device can be firmly connected to the vehicle body and which can accommodate relatively large forces.

SUMMARY OF THE INVENTION

In a support device for supporting an article particularly in a motor vehicle comprising a support arm having at one end thereof a mounting element, the mounting element includes a cylindrical bushing of an elastic material for reception in a cylindrical opening and means are provided for expanding the bushing into firm engagement with the wall of the opening are provided for securely supporting the support arm in the cylindrical opening.

Since the plug-in structure is in the form of a cylindrical bushing, which can be expanded by an operating element, the gooseneck or support arm can be firmly mounted in a corresponding opening. By expanding the cylindrical bushing, the bushing is brought into firm engagement with the walls of the opening so that the gooseneck is held in position and can then be bent into a position convenient to the driver depending on what article is mounted on the free end of the gooseneck. For releasing the gooseneck from the mounting opening, the diameter of the bushing is again reduced so that it is released from the cylindrical wall of the opening.

It is particularly advantageous if the gooseneck support bushing is so sized that it fits into the opening of a cigarette lighter receptacle which is generally present in each motor vehicle. Since this receptacle is firmly mounted to the vehicle body, a reliable and stable connection between the gooseneck and the vehicle body can be established.

The expandable bushing preferably consists of a thermoplastic polyurethane (TPU) or of rubber. Those materials are resilient so that their diameter can be increased by deformation of the bushing in a simple and reliable manner.

The material or bushing can be expanded in various ways. It could for example be expanded by inflation of a balloon-element. Also, a bushing could be axially compressed whereby it would expand radially into firm engagement with the surrounding cylindrical wall of the receptacle.

In a preferred embodiment, however, the bushing is provided at its opposite axial ends with conical inner walls whose diameters increase toward the axial end faces of the bushing. Conical engagement members are received in the conical ends of the bushing and means are provided for moving the engagement members toward each other for expanding the bushing or moving the engagement members apart from each other for reducing the diameter of the bushing.

The means for moving the engagement members is preferably a threaded rod which extends centrally through the conical engagement members and is threaded into one of the conical engagement members so that, upon rotation of the threaded rod in one direction, the conical engagement members move toward each other and, upon rotation of the threaded rod in the opposite direction, they move away from each other. But other structures may be used such as a cable or an eccenter mechanism by which the conical engagement members can be moved closer together for expanding the bushing. The threaded rod for operating the engagement members may be part of the support arm or gooseneck which extends from the mounting or clamping structure. Then, the gooseneck is directly connected to the vehicle body or rather the cigarette lighter socket providing for a play-free connection.

Preferably, the support arm or gooseneck comprises a flexible tube through which a non-resilient, flexible rod extends. Such a structure is very inexpensive since the flexible tube, as well as the rod, are commercially available products. The flexible tube may be a corrugated plastic tube which tends to return to its original shape and the rod may be an aluminum rod or wire which keeps the shape into which it is bent and provides the required strength. In a preferred embodiment, the aluminum rod has a diameter one half the inner diameter of the plastic tube.

It is particularly advantageous if the tube is provided at each end with a plug which is firmly connected to the tube and to the rod. The firm connection between the tube and the rod at opposite ends of the tube may be achieved by flattening the rod at opposite ends and providing flat passages in the plugs which receive the flattened ends of the rod in a form-locking manner.

At its end opposite its mounting structure, the support arm is preferably provided with an adapter plate, on which various devices can be mounted.

The adapter plate may be a flat plate with a self-adhesive surface or with a hook-and-loop connecting structure. In a preferred embodiment, the adapter plate is provided with angled retaining claws adapted to engage webs formed in recesses of a device which is to be attached to the adapter plate. Preferably, the recesses have at least twice the width of the retaining claws in the direction transverse to the plane of the angle of the claws. Then the device engaged by the claws can be locked and disengaged from the adapter plate simply by displacement of the device on the adapter plate. With this adapter plate, the support arm can be used in connection with various devices which are provided with the respective recesses and engagement webs for the retaining claws. They can be rapidly attached to, or removed from, the support arm.

Particular features of the invention will become more readily apparent from the following description thereof on the basis of the accompanying drawings.

DESCRIPTION OF A PREFERRED EMBODIMENT

Figure 1:
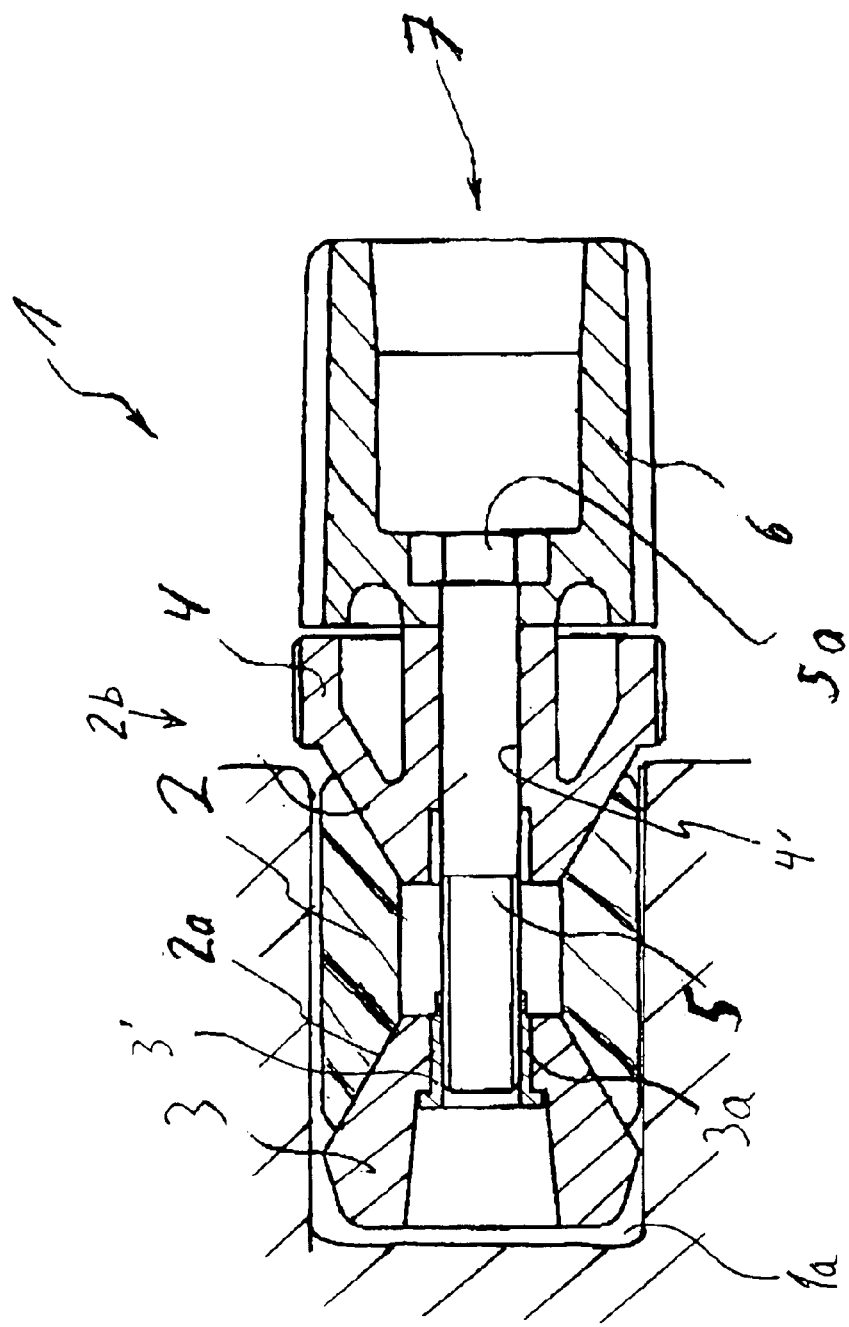
FIG. 1 shows the clamping element 1 at one end of a support arm.

The clamping element 1 comprises a bushing 2 which consists of an elastic material and which is provided at its opposite axial ends with conical openings 2a, 2b with a diameter which increases toward their axially outer ends. Preferably, the elastic material is a thermoplastic polyurethane (TPU) or rubber. Conical engagement members 3, 4 are received in the conical openings 2a, 2b and provided with axial openings 3' and 4' respectively. A threaded rod or bolt 5 extends through the opening 4' in the engagement member 4 and is threaded into a threaded element 3a disposed in the opening 3' of the conical engagement member 3. The threaded element 3a preferably consists of brass.

The engagement member 4 shown in FIG. 1 on the right is circumferentially knurled so that it can be easily grasped for retaining it in position.

At its end opposite the threaded area, the bolt 5 extends into a sleeve 6, which is provided with an opening 7. The sleeve 6 furthermore includes a recess in which the head 5a of the bolt 5 is received in a form-locking manner so as to prevent relative rotation between the bolt 5 and the sleeve 6. As a result, the bolt 5 can be rotated by the sleeve 6. At its circumference, the sleeve 6 is also knurled to facilitate rotation thereof by hand.

By rotating the sleeve 6 and, together therewith, the bolt 5, the bolt 5 is screwed into the threaded element 3a whereby the engagement member 3 is moved toward the engagement member 4 and an axial compressing force is applied to the elastic bushing 2.

At the same time, the engagement members 3 and 4 move deeper into the conical end openings 2a, 2b of the bushing 2, thereby expanding the bushing 2 whereby the outer diameter of the bushing 2 is increased. If the bushing 2 of the clamping element is disposed in a cylindrical opening 1a such as a cigarette lighter receptacle of a motor vehicle, the bushing wall is pressed into firm contact with the wall of the cylindrical opening of the cigarette lighter receptacle and is firmly engaged therein. Since the radially outer diameters are increased to a larger extent in the axially outer areas of the bushing 2, the clamping element is supported in a very firm, wiggle-free manner.

Figure 2:
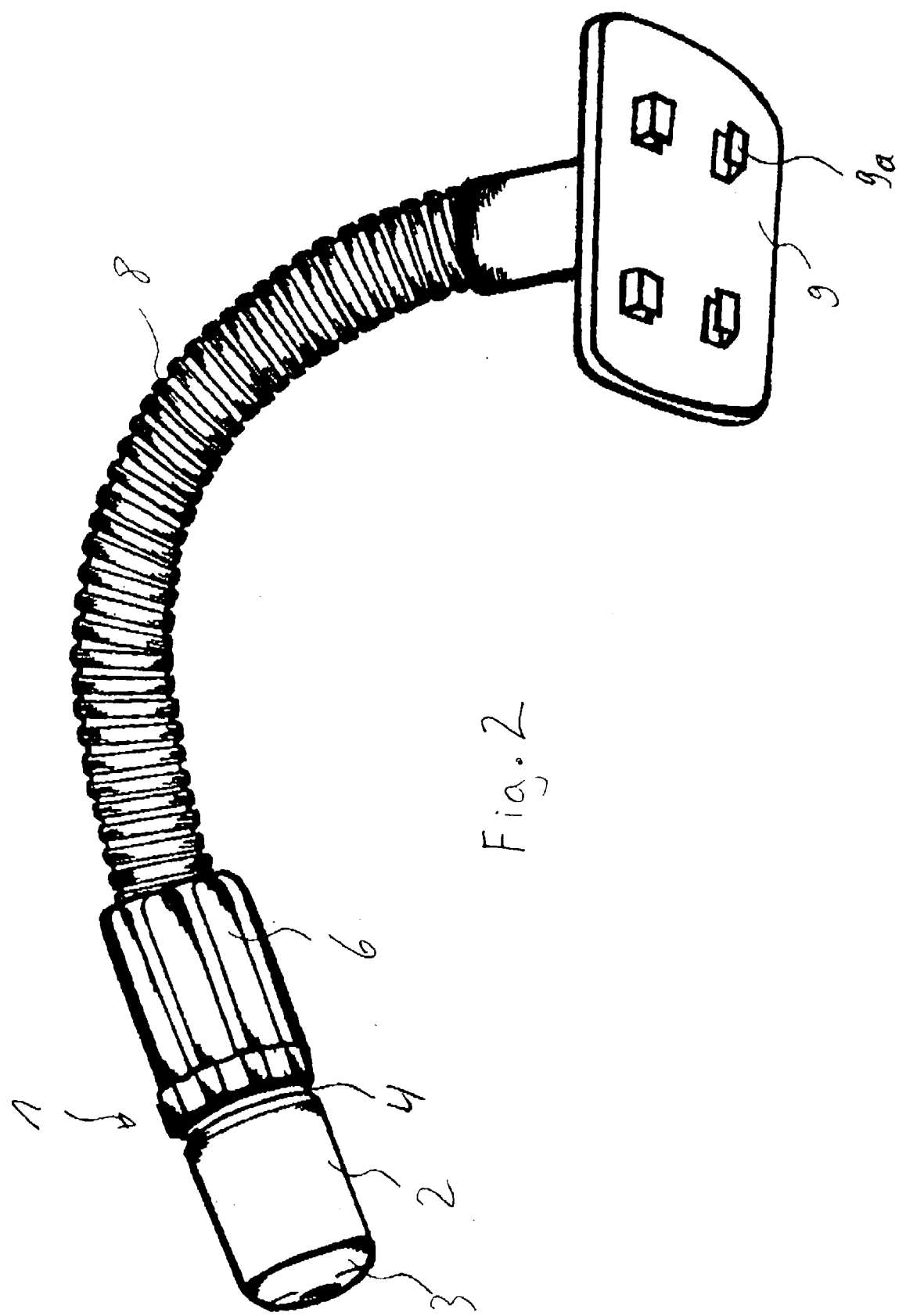
FIG. 2 shows the support arm in the form of a gooseneck.

As shown in FIG. 2 in a particular embodiment of the invention, a support arm 8 extends into the opening 7 in the sleeve 6. The support arm 8 consists preferably of a flexible tube in which an aluminum rod extends as described in U.S. Pat. No. 6,032,910. At its end remote from the clamping element 1, the support arm is provided with an adapter plate 9, which includes angled claws 9a. By way of the angled claws 9a, objects or devices can easily be mounted onto the adapter plate 9 if they are provided with recesses and webs that can be engaged by the angled claws as shown in U.S. Pat. No. 5,740,995. In this way, the support device according to the invention can be used in a universal way for the firm support of various objects or devices, which can be attached by simply placing them onto the adapter plate 9 and moving the corresponding engagement means of such objects or devices into engagement with the claws 9a on the adapter plate 9.

It is also possible to provide the clamping element 1 with contacts for connection to the electrical power supply of the motor vehicle when the clamping element 1 is mounted into the cigarette lighter receptacle. Wires extend then from these contacts to a contact structure on the adapter plate 9. A device mounted onto the adapter plate 9 may then be provided with a corresponding contact structure and may be supplied with power from the cigarette lighter socket by way of the wiring extending through the support arm 8.

What is claimed is:

1. A support device for supporting an article, particularly in a motor vehicle, comprising a support arm (8) consisting of a flexible tube with a bendable rod disposed therein and having at one end thereof an adapter plate (9) for supporting said article at the other end a clamping element (1) including a cylindrical bushing (2) of an elastic material for reception in a cylindrical opening (1a) defined by a wall, said cylindrical bushing (2) being provided at opposite axial ends with conical openings (2a, 2b) whose diameters increase toward the axial outer ends of the cylindrical bushing (2), conical engagement members (3, 4) arranged at the opposite ends of said cylindrical bushing (2), and a threaded bolt (5) extending axially through said conical engagement members (3, 4), by which the conical engagement members (3, 4) are movable toward each other for expanding said bushing (2) into firm engagement with the wall of said opening (1a) for securely supporting said clamping element (1) in said cylindrical opening (1a), said clamping element (1) including a sleeve (6) connected to said threaded bolt (5) for operating said bolt 95) and including an opening (7) in which said support arm (8) is mounted.

2. A support device according to claim 1, wherein the outer diameter of said cylindrical bushing is increased at least partially by deformation of the bushing material.

3. A support device according to claim 1, wherein said cylindrical bushing (2) consists of a thermoplastic polyurethane.

* * * * *